United States Patent
Piere

[11] 3,791,692
[45] Feb. 12, 1974

[54] AUTOMOBILE IMPACT ABSORPTION APPARATUS

[76] Inventor: Benjamin H. Piere, 19631 Delight St., Saugus, Calif. 91350

[22] Filed: Apr. 20, 1972

[21] Appl. No.: 245,715

[52] U.S. Cl. ............ 296/31 P, 206/46 FC, 293/63, 293/69
[51] Int. Cl. .......................................... B62d 25/00
[58] Field of Search..... 296/28 R, 31 P; 293/63, 69, 293/71 R; 206/46 FC

[56] References Cited
UNITED STATES PATENTS

| | | | |
|---|---|---|---|
| 3,655,237 | 4/1972 | Pitman | 296/28 R |
| 3,409,323 | 11/1968 | Schweser | 296/28 R |
| 3,090,339 | 5/1963 | Carr | 9/8 R |
| 3,595,335 | 7/1971 | Wessells et al. | 293/69 X |
| 3,625,561 | 12/1971 | Huber | 296/28 R |
| 2,876,037 | 3/1959 | Ingolia et al. | 296/28 R |

Primary Examiner—Kenneth H. Betts
Assistant Examiner—Leslie J. Paperner
Attorney, Agent, or Firm—Daniel T. Anderson

[57] ABSTRACT

Apparatus for absorbing the energy of the impact of a collision of an automobile. The apparatus consists of an impact-energy absorbing material such as a plastic foam which may be molded in one piece for disposition in the trunk of the automobile. Preferably, the automobile is of the type having a rear engine and a front trunk into which the gasoline tank usually extends. The monolithic, molded foam may be cut into several sections, preferably three to facilitate insertion of the material into the trunk. Such a material has the advantages of reducing injuries due to collisions as well as reducing the cost of repair. It provides flotation, acoustic damping, and may be fire retardant to reduce even further the danger of fire if rupturing of the gas tank does occur in spite of the added impact protection. The plastic foam may be so arranged that it transmits the force of a front impact toward the side walls of the trunk which usually are stronger than the fire wall.

1 Claim, 3 Drawing Figures

PATENTED FEB 12 1974 3,791,692

AUTOMOBILE IMPACT ABSORPTION APPARATUS

BACKGROUND OF THE INVENTION

This invention relates generally to automobiles, and particularly relates to apparatus for absorbing the energy of an impact to minimize injury to driver or passengers.

It has long been recognized that the bumper of an automobile is fairly inefficient in absorbing the energy of an impact. Many devices have been proposed in the past to solve the problem of protecting the driver of an automobile and its passengers from personal injury. Most of these have taken the form of utilizing energy absorbing materials which are incorporated into the bumper of the automobile or which become part of the outer vehicle walls. Some of these energy-absorbing materials have been proposed in the form of a cushion to protect the roof of an automobile or other outer walls thereof.

Among such energy-absorbing materials have been proposed plastic foam materials which are nonelastically compressible or crushable. Other proposals relate to the use of a tubular, rigid material filled with foam plastic or the like. In some cases it has been proposed to fill the foam with a liquid having a controlled rate of release to absorb the energy of an impact. Still other proposed apparatus relate to the use of two different plastic foams of different density to control in a programmed manner the absorption of the energy due to an impact.

It is accordingly an object of the present invention to provide an impact-energy absorbing apparatus which may be disposed in the trunk of an automobile to protect not only the drivers and passengers from impact but also the gasoline tank normally extending into the trunk.

A further object of the invention is to provide an apparatus of the type discussed which will reduce repair costs and transmit the force of a collision to a larger area which is naturally strong such as the side walls of the trunk.

Another object of the invention is to provide apparatus for absorbing the energy of an impact which also serves as an acoustic damping device, provides fire protection by being fire retardant and helps in keeping the automobile afloat in water.

SUMMARY OF THE INVENTION

In accordance with the present invention there is provided a material which will absorb the energy of an impact such, for example, as a plastic foam. The material preferably has a density less than that of water to assist keeping the vehicle afloat in water in case of an accident resulting in lake or river immersion. The material may also be fire retardant to protect the occupants of the vehicle from fire in case of damage to the gasoline tank.

The plastic foam is preferably molded in a single piece in the shape of the interior of the trunk of the automobile. Preferably, but not necessarily, the automobile is of the rear engine type having a front trunk into which the gasoline tank usually extends. The molded plastic foam may be cut into sections to facilitate insertion into the trunk. Preferably, the sections are wedge or pie-shaped and serve the additional purpose of transmitting the impact energy toward the sides of the trunk which is usually stronger than the fire wall.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawing.

DESCRIPTION OF THE PREFERRED EMBODIMENT

Figure 1:
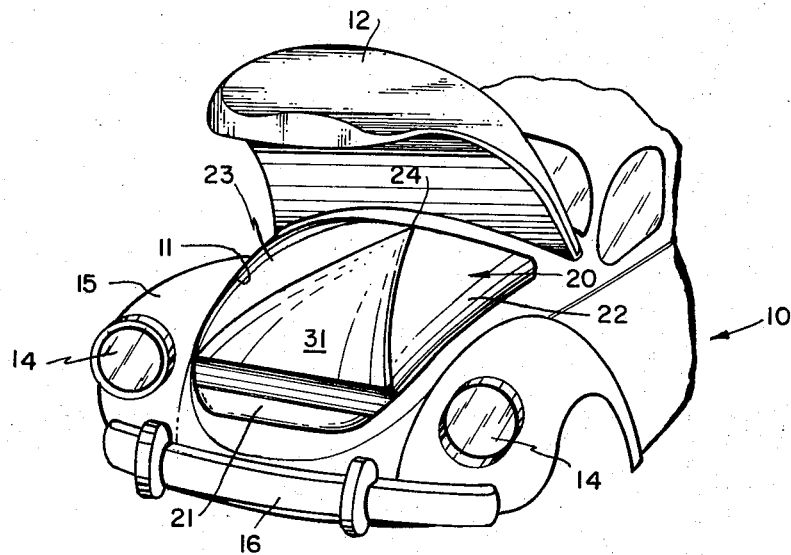
FIG. 1 is a view in perspective of an automobile such, for example, as a Volkswagen showing the trunk lid open and the impact energy-absorbing material of the invention inserted into the trunk.

Referring now to the drawing and particularly to FIG. 1, there is shown by way of example the front portion 10 of a Volkswagen into the trunk 11 of which the impact energy-absorbing material is incorporated in accordance with the present invention. However, it will be understood that while FIG. 1 shows an automobile of the rear engine type with a front trunk, it is also feasible to utilize the apparatus of the invention in a more conventional automobile of the type having a front engine and a rear trunk. Accordingly, whether the automobile has a front trunk or a rear trunk it will protect the driver and passengers from a collision in either front or rear direction, as the case may be.

Thus, as shown in FIG. 1, the automobile includes a trunk lid 12 which is shown open, a pair of headlights 14 and fenders 15 which surround the space of the trunk 11. The automobile is also provided with a conventional front bumper 16. Normally, a gasoline tank as shown at 17 in FIG. 2 extends partly into the trunk space.

In accordance with the present invention the trunk space 11 is substantially filled with an impact-energy absorbing material 20. This may be a plastic foam material which may be molded in one piece to form a monolithic structure. Preferably, the impact absorbing material 20 consists of foamed, expandable polystyrene. Such a foam plastic is characterized by a non-interconnecting cell structure. As a result, the water absorption of the material is extremely low. This material is also inert to metals and may be made flame retardant. Its density may be as low as 1/60 that of water to help in keeping the automobile afloat in water in case of an accident.

Like all impact absorbing materials, the plastic foam 20 should not be rigid but should be compressible under impact so as to produce a programmed crushing of the material under impact. In other words the material will be compressed within a certain period of time.

The plastic foam 20 may be cut after molding into a plurality of sections such as the three sections 21, 22 and 23 shown in FIG. 1. The section 21 is broad in the front and tapers substantially to a point as shown in 24. Accordingly, the section 21 may be considered to be wedge or pie-shaped. The other two sections 22 and 23 may be symmetrical in shape and take up the remainder of the space of the trunk 11. However, it will be understood that instead of the three sections shown in FIG. 1 there may be as few as two or more than three pieces. by sectioning the plastic foam 20, insertion of the pieces into the trunk is facilitated. It is also feasible to remove one or more of the pieces to provide space for luggage, tools or the like.

Figure 2:
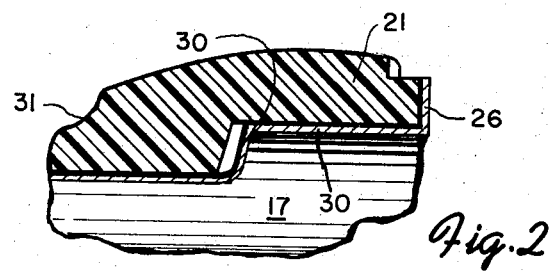
FIG. 2 is a cross-sectional view of the trunk of the automobile of FIG. 1 showing both the bottom wall of the trunk and the impact absorbing wedge of the invention inserted therein.
Figure 3:
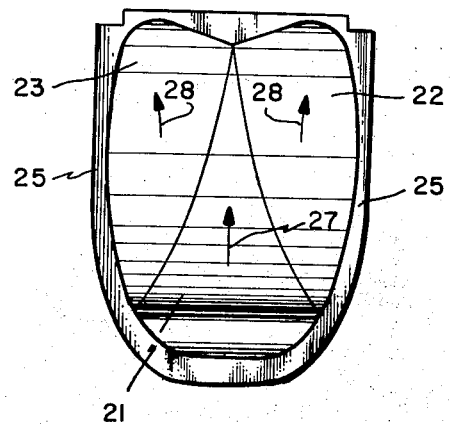
FIG. 3 is a schematic top plan view of the impact-energy absorbing material of the invention and the walls of the trunk, and indicates how the energy of a front impact is transmitted in a generally lateral direction.

As shown particularly in FIG. 3, the three sections 21, 22 and 23 also serve the purpose to distribute a frontal impact onto the side walls 25 of the trunk which are generally much stronger than the fire wall 26 between the trunk 11 and the driver. Thus, as shown in FIG. 3, a frontal impact will cause a force represented by arrow 27. This force initially directed toward section 21 exerts a lateral force as shown by arrows 28 on the two sections 22 and 23. As a result, the energy of a frontal impact is spread laterally to exert a force on the trunk side walls 25, that is on a larger area than that of the initial impact It will be understood that the plastic foam 20 will have to be shaped to fit the interior of any particular trunk. Thus, it may have to be provided with a step like recess 30 as shown in FIG. 2 to fit over the gasoline tank 17. The same applies to the outer surface of the material 20 which may require a scooped-out portion shown at 31 to conform to the interior shape of the trunk lid 12.

It will now be evident that the molded plastic foam material 20 has many advantages. It will reduce injury to driver and passengers during collision and reduce repair costs because it minimizes damage to the automobile. It protects the sometimes flimsy fire wall by directing the force of the impact toward the side walls, that is in a direction where the car body is usually much stronger. The material 20 preferably is fire retardant and thus gives fire protection. It also provides acoustic damping. Since the sections may be made removable they create flexibility in providing storage space for luggage and tools when needed. Finally, metal-to-metal contacts are minimized with the resultant advantage of minimizing damage to the car body.

It may also be desired to provide a special latch for the trunk lid. This will prevent opening of the trunk lid due to an impact and prevent the impact absorbing material 20 from floating out of the trunk in case the vehicle should accidentally become immersed in water.

There has thus been illustrated and described an example of an automobile impact absorption apparatus which achieves the objects and exhibits the advantages set for hereinabove.

I claim:

1. An automobile impact absorption device adapted to be inserted into the empty trunk of an automobile, said device comprising:

an impact-energy absorbent, plastic foam material which substantially fills the entire trunk space of an automobile and surrounds the gasoline tank thereof;

said plastic foam material consisting of three sections, the central section being broad at the access portion of the trunk and converging substantially to a point at the opposite portion of the trunk whereby the energy of an impact is distributed toward the side walls of the trunk.

* * * * *